United States Patent [19]

Pepping et al.

[11] Patent Number: 5,299,669
[45] Date of Patent: Apr. 5, 1994

[54] VIBRATION ELIMINATOR

[75] Inventors: Karl-Heinz Pepping, Schleiden; Hubert Hausmann, Merchernich; Michael Engel, Neuendorf; Gunther Gebhardt, Stadtkyll, all of Fed. Rep. of Germany

[73] Assignee: Diehl GmbH & Co., Nuremberg, Fed. Rep. of Germany

[21] Appl. No.: 35,907

[22] Filed: Mar. 23, 1993

Related U.S. Application Data

[63] Continuation of Ser. No. 797,433, Nov. 22, 1991, abandoned.

[30] Foreign Application Priority Data

Nov. 28, 1990 [DE] Fed. Rep. of Germany ....... 4037786

[51] Int. Cl.⁵ ............... F16F 15/08; G05G 25/00
[52] U.S. Cl. ................... 188/379; 74/473 R; 74/502.4
[58] Field of Search ............ 188/378, 379, 380; 192/30 V, 99 S; 74/473 R, 502.4; 267/152, 257, 292

[56] References Cited

U.S. PATENT DOCUMENTS

| | | | |
|---|---|---|---|
| 3,657,943 | 4/1972 | Bruhn, Jr. et al. | 74/473 R |
| 4,266,439 | 5/1981 | Hayashi et al. | 188/379 |
| 4,722,428 | 2/1988 | Nishida | 192/30 V |
| 4,953,672 | 9/1990 | Onimaru et al. | 188/378 |

FOREIGN PATENT DOCUMENTS 2930674 12/1981 Fed. Rep. of Germany.
52-26656 6/1977 Japan ............... 192/30 V

*Primary Examiner*—Robert J. Oberleitner
*Assistant Examiner*—Kevin D. Rutherford
*Attorney, Agent, or Firm*—Scully, Scott, Murphy & Presser

[57] ABSTRACT

A vibration eliminator or suppressor for an actuating element of a set of components or aggregate, such as the clutch arrangement of a motor vehicle. A transitional element between a wire cable or a linkage and a lever of the aggregate is constructed as a cage, wherein the lever is floatingly or swimmingly supported within the cage through a prestressed two-component rubber spring, with the lever being fixedly connected with the rubber spring, and a weight being fastened to the cage. Through the intermediary of this structure there is achieved a complete isolation of any vibrations between the clutch shift and the clutch drive train due to the rubber spring.

11 Claims, 1 Drawing Sheet

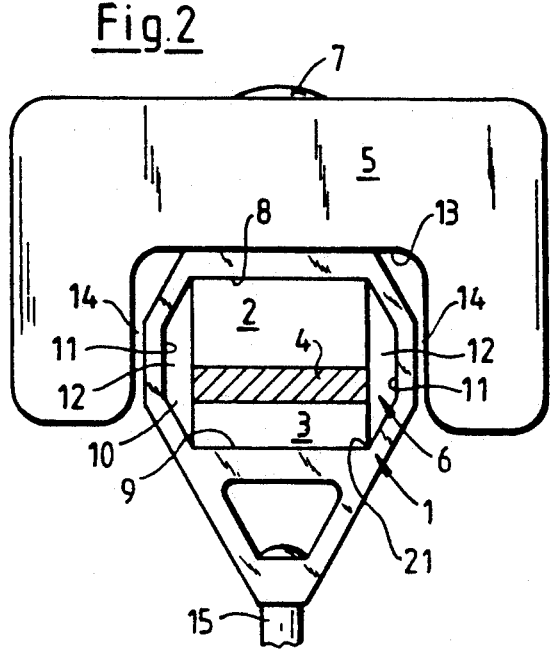
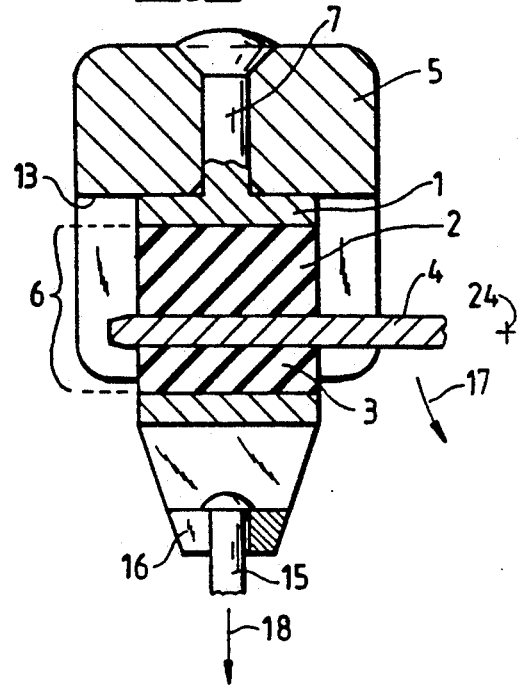
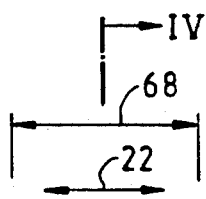
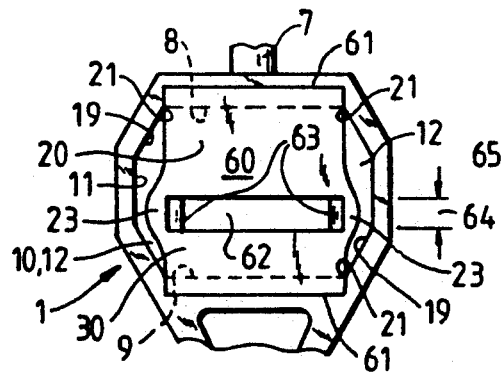
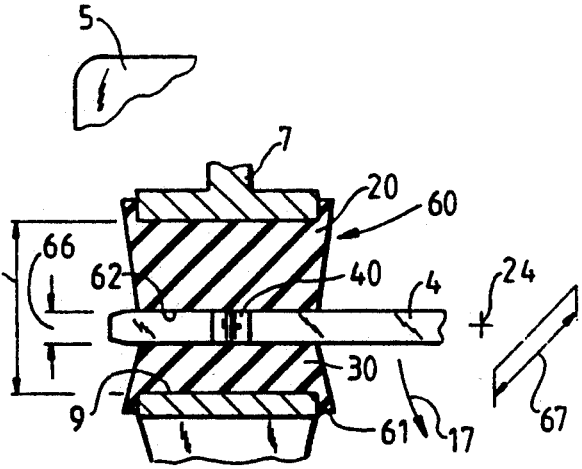

VIBRATION ELIMINATOR

This is a continuation of application Ser. No. 07,797,433 filed on Nov. 22, 1991, now abandoned.

BACKGROUND OF THE INVENTION

1. Field of the Invention

The present invention relates to a vibration eliminator or suppressor for an actuating element of a set of components or aggregate, such as the clutch arrangement of a motor vehicle.

Vibration eliminators serve for the suppressing or elimination of disturbing vibrations which are generated by aggregates or operative components. The elimination of the vibration is carried out through a weight in cooperation with a rubber element, in conformance with a spring-mass system.

2. Discussion of the Prior Art

From the disclosure of German Laid-Open Patent Appln. No. 29 30 674, in a disengaging or unclutching arrangement for the clutch of a motor vehicle it has already become known that the play can be eliminated between the arms of a shift lever and a slide sleeve of an axially displaceable clutch disengaging or uncoupling bearing through the intermediary of a separate damping element. For this purpose, the damping element can be constituted as an elastically yieldable profiled spring which consists of metal or a plastic material. Such a profiled spring does not serve for the elimination or suppression of vibrations, but rather for the attenuation of otherwise audible clutch noises and intense vibrations which are encountered at the clutch pedal. These two effects represent a considerable loss in driving comfort for a driver.

SUMMARY OF THE INVENTION

Accordingly, it is an object of the present invention to propose a vibration eliminator or suppressor for a set of operating components or aggregate; such as the clutch for a motor vehicle, which is actuatable through an actuating or shift element, such as a wire cable or shift linkage, which reduces or even completely eliminates the audible clutch noises and intense vibrations encountered at an actuating or shift element.

The invention attains the object pursuant to the foregoing concept in that a transitional element between a wire cable or a linkage and a lever of the aggregate is constructed as a cage, wherein the lever is floatingly or swimmingly supported within the cage through a prestressed two-component rubber spring, with the lever being fixedly connected with the rubber spring, and a weight being fastened to the cage.

Advantageous modifications and embodiments of the invention may be more readily ascertained from the following detailed description as set forth hereinbelow.

Through the intermediary of the invention there is achieved a complete isolation between the clutch shift and the clutch drive train by means of the rubber spring. By-pass of the isolation are avoided during the actuation of the clutch. An isolation of the vibrations is also present in the non-actuated condition through the presence of the two rubber elements which are prestressed against each other. The disturbing vibrations and noises are completely eliminated or suppressed through the action of the inventive spring-mass system.

The operational dependability of the inventive vibration eliminator is predicated on the aspect in that the latter is exclusively subjected to compression. Springs of this type, as long as they are not overloaded, are completely uncritical with respect to their service life. Even in the presence of tears or fissures in the rubber, there is no adverse influence over the function of the clutch; at most the degree of comfort.

The floating or swimming support of the clutch shift lever within the cage provides; on the one hand, a good isolation, and on the other hand, allows for the integration of the vibration eliminator into the smallest installation space.

In accordance with a further feature of the invention whereby the weight is U-shaped and at least partly encompasses the cage, the weight is arranged in a space-saving manner on the cage.

The damping or attenuating properties of the rubber elements are not influenced by the cage in that in the regions towards the sides of the lever there is always present an open space to the cage.

Simply producible connections are obtained for the clutch shift lever with the rubber elements are being connected with the spring through vulcanizing. Moreover, the rubber spring is connected with the lever in a form or close fitting and frictionally-transmissive manner. Moreover, the rubber spring is in a close fit and is seated under prestressing in the cage, and for the lever there is provided in a rubber spring an expandable through opening which produces the prestressing, whereby the lever for the closely fitted fixing in the rubber spring is provided with side recesses, and the rubber springs includes projections which can be snapped into the recesses. Moreover, a space saving construction for the weight and an expedient location for the center of gravity of the vibration eliminator is also provided for in that the weight is U-shaped and at least partly receives the cage therein. A good centering of the rubber components in the cage is also contained in that the cage in the axis of the cable drive train includes planar contact surfaces for the rubber block, and at the sides thereof hereby possesses inclined sidewalls which fix the rubber block on the planar contact surfaces. Moreover, optimized heights for the rubber components are also contained in that these are in a ratio of about 2:1.

BRIEF DESCRIPTION OF THE DRAWINGS

Reference may now be had to exemplary embodiments of the invention as set forth in the following detailed description, taken in conjunction with the accompanying drawings; in which:

FIG. 1 illustrates a cross-sectional view through a vibration eliminator or suppressor pursuant to the invention;

FIG. 2 illustrates a side view of the vibration eliminator of FIG. 1;

FIG. 3 illustrates another embodiment of the vibration eliminator; and

FIG. 4 illustrates a sectional view of the vibration eliminator taken along line IV—IV in FIG. 3.

DETAILED DESCRIPTION

Pursuant to FIGS. 1 and 2, a cage 1 possesses two prestressed rubber elements or components 2, 3 of a rubber spring which is identified by reference numeral 6. A weight 5 is connected with the cage 1 through a rivet-like element 7. A clutch shift lever 4 which is pivotable about a point or rotation 24 is fixedly connected with the rubber components 2, 3 through the intermediary of vulcanizing. In the same manner, the rubber component 2 is vulcanized to an upper surface 8 of the cage 1, whereas it only contacts a lower surface 9 of the cage under prestressing. Both rubber components 2, 3, are illustrated as being prestressed in the installed condition.

The clutch shift lever 4 and the weight 5 are both constituted from steel. The cage 1 is constituted from aluminum.

The rubber spring components 2, 3 are constructed in the shape of rectangles and arranged in such a manner within an opening 10 of the cage 1 together with the lever 4, that the rubber spring 6 and the lever 4 are always at an open spacing 12 with regard to the sidewalls 11.

The weight 5 is configured U-shaped and receives the cage 1 in a recess 13 with lateral spacings 14.

A wire cable 15 is fastened in a close fit within a slit 16 in the cage 1.

The description of the operation is essentially as follows:

Through the prestressed rubber components 2, 3, the lever 4 is located in a condition of power or force equilibrium.

When a clutch pedal (not shown) is actuated in order to move the lever 4 by means of a bearing (not shown) in the direction of arrow 17, then as a result of the pulling direction 18 for the cable, the rubber component 2 is compressed over a relatively lengthy spring deflection; however, the rubber component 3 is unstressed.

The unstressing of the rubber component 3 is effected to the extent in which it was previously prestressed.

Thereafter, the rubber component 3 eventually raises away from the surface 9. A characteristics line (not shown) on the spring element 3 is resultingly imparted a bend and forms a transition into a more pliant new characteristics line which is necessary for the correlation; or in essence, the function of the vibration eliminator or suppressor. The time when the lever sets itself into motion depends upon the counterforce of the clutch arrangement.

Through the inventively prestressed system there is achieved that even vibrations, which are encountered in the region of the characteristics line for the spring components 2, 3 at a clutch pedal which is not activated, are suppressed; in essence, completely eliminated.

Pursuant to FIGS. 3 and 4, inserted into the cage 1 is a unitarily or single-piece constructed rubber spring 60 and through ridges 61 maintained in a close form-fit The element 7, in accordance with FIG. 1, serves for the fastening of the weight 5.

A through-extending opening 62 with two protuberances 63 which are located opposite each other possesses a height 64 which, at a height 65 of 30 mm for the rubber spring 60 is by 1.5 mm shorter than a height 66 for the clutch shift lever 4.

A width 67 for the clutch lever 4 conforms to a width 68 for the opening 62.

In conformance with the protuberances 63 there are provided recesses 40 on the clutch lever 4.

Angled or tapered sidewalls 19 on the cage 1 form impact edges 21 with the planar contact surfaces 8, 9. These impact edges 21, a close fit, fasten the rubber spring 60 in the direction of arrow 22.

At the pressing in of the clutch lever 4 into the opening 62, the protuberances 63 snap or engage into the recesses 40 thereof, and the rubber spring 60 is imparted its prestressing in the cage 1. As a result, there is then present a close or form-fitting and power or friction-transmissive connection for the clutch lever 4, as well as for the rubber spring 60 in the cage 1. Consequently, the rubber components 20, 30 of the rubber spring 60 are thereby also imparted their prestressing. The rubber elements 20, 30, are interconnected by means of webs 23.

The unitarily constructed rubber spring 60 with its capability for easy assembling represents also with regard to the clutch lever 4 a significant savings in costs.

Hereby, it is surprising that the necessarily different spring deflections of the rubber components 20, 30 are attained in a simple manner through the subdivision of the height 65 of the rubber spring 60 into one-third and into two-thirds of the mentioned height.

The rubber springs 2, 20, due to their constructional height are approximately four times as soft or pliant as the rubber springs 3, 30.

It is important to the invention that the prestressing of the inherently operating springs 2, 20 is carried out against a harder spring 3, 30. This has namely the disadvantage that in contrast with a system which is prestressed against a more rigid body, there must be assumed an additional loss in the deflection for the spring 3, 30; however, there is obtained the advantage that the system itself is completely isolated during the non-actuation of the clutch, and serves as a vibration eliminator or suppressor.

At the stepping on a clutch pedal (not shown), the cage 1 is pulled in the direction 18. The more pliant rubber component 2, or 20, is resultingly compressed, and the harder rubber component 3, or in essence 30, is decompressed; in effect, it looses its prestressing.

As soon as the spring elements 3, 30 raise away from the cage wall 9, the spring characteristics line is imparted a bend.

Thereafter, there then follows the compressing of the more pliant rubber component 2, or respectively 20, with a substantially more extensive spring deflection than in the initial range. First in this initial deflecting range are the spring forces of the springs 2, 3 so large such that this results in a pivoting of the clutch lever 4 in the direction 17, as a result of which the clutch contact linings (not shown) lift away or disengage from each other.

At the closing of the clutch, its closure springs (not shown) act opposite the direction 17, whereby the loading of the rubber components 20, 30 is effectuated in the reversed sequence.

Through the combination of the more pliant rubber components 2, 20 with the harder rubber components 3, 30 there is achieved, on the one hand, a relatively short overall spring deflection whereby; however, the inherent frequency of the vibration eliminator which is necessary during clutching is achieved exclusively through the spring rigidity of the pliant springs 2, 20; while, on the other hand, engine vibrations are isolated at the clutch pedal which is not actuated and eliminated, such that the clutch pedal is fully at rest or calm.

What is claimed is:

1. A vibration suppression assembly for an actuating element of an aggregate, said vibration suppression assembly being operatively interposed between a linkage means and a shift lever of said aggregate, the vibration suppression assembly comprising:
   a cage operatively connected to the linkage means and forming upper, lower, left, and right inside surfaces;

a prestressed rubber spring captured in said cage and fixedly connected to the shift lever, the rubber spring including
  i) a first prestressed compressible element compressed between the shift lever and the upper inside surface of the cage, and
  ii) a second prestressed compressible element compressed between the shift lever and the lower inside surface of the cage,
wherein the cage holds the rubber spring spaced from the left and right inside surfaces of the cage over substantially the lengths of said inside surfaces; and
a weight mounted on the cage to help dampen vibrations.

2. A vibration suppression assembly as claimed in claim 1, wherein the weight is U-shaped and at least partly encompasses said cage.

3. A vibration suppression assembly as claimed in claim 1, wherein an open space is formed between each of two side regions of the lever and the cage.

4. A vibration suppression assembly as claimed in claim 1, whereby the lever is vulcanized to the rubber spring.

5. A vibration suppression assembly as claimed in claim 1, wherein the rubber spring is connected friction-transmissively with the lever.

6. A vibration suppression assembly as claimed in claim 1, wherein the rubber spring is seated under prestressing in the cage, said rubber spring having an expandable through-opening for the lever which produces the prestressing, said lever for form-fitted fastening in the rubber spring being provided with recesses at the sides thereof and with protuberances engageable into the rubber spring.

7. A vibration suppression assembly as claimed in claim 1, wherein the height is U-shaped and at least partly receives the cage therein.

8. A vibration suppression assembly as claimed in claim 1, wherein the cage includes planar contact surfaces for contacting the rubber spring in the axial direction of the linkage means, and tapered sidewalls extending from the planar contact surfaces of the cage which fasten the rubber spring against the planar contact surfaces.

9. A vibration suppression assembly as claimed in claim 1, wherein the parts of the rubber spring have heights which are in a ratio of about 2:1 relative to each other.

10. A vibration suppression assembly according to claim 1, wherein
the first compressible element has a given stiffness; and
the second compressible element has a stiffness greater than said given stiffness.

11. A vibration suppression assembly according to claim 10, wherein:
the second compressible element is connected to the shift lever for movement therewith;
the second compressible element is in a releasable engagement with the lower inside surface of the cage, and is adapted to lift off said lower inside surface.

* * * * *

UNITED STATES PATENT AND TRADEMARK OFFICE
CERTIFICATE OF CORRECTION

PATENT NO.  : 5,299,669
DATED       : April 5, 1994
INVENTOR(S) : Karl-Heinz Pepping, et al.

It is certified that error appears in the above-indentified patent and that said Letters Patent is hereby corrected as shown below:

Column 3, line 49, after "form-fit" insert --.--

Column 6, line 5, Claim 7: "height" should read --weight--

Signed and Sealed this

Tenth Day of January, 1995

Attest:

BRUCE LEHMAN

Attesting Officer        Commissioner of Patents and Trademarks